United States Patent [19]

Saether

[11] 4,074,697

[45] Feb. 21, 1978

[54] DUAL HANDLE MIXING FAUCET

[75] Inventor: Gustav Saether, Leksvik, Norway

[73] Assignee: Lyng Industrier A-S Leksvikarmatur, Leksvik, Norway

[21] Appl. No.: 700,303

[22] Filed: June 28, 1976

[30] Foreign Application Priority Data

July 4, 1975 Norway .................................. 752426

[51] Int. Cl.² .......................................... F16K 19/00
[52] U.S. Cl. .................................. 137/606; 137/801;
251/268; 251/285; 251/335 A
[58] Field of Search .................... 4/192; 137/606, 801;
251/268, 335 A, 285

[56] References Cited

U.S. PATENT DOCUMENTS

| 1,258,262 | 3/1918 | Shapley | 137/606 X |
|---|---|---|---|
| 1,740,156 | 12/1929 | Crane et al. | 137/606 X |
| 1,747,640 | 2/1930 | Morris | 137/606 |
| 2,075,740 | 3/1937 | McKay | 137/606 X |
| 2,251,414 | 8/1941 | Neal | 251/285 X |
| 2,262,290 | 11/1941 | Kuhnle | 137/606 X |
| 2,757,898 | 8/1956 | Cox | 251/335 A X |
| 3,395,734 | 8/1968 | Spencer | 137/606 X |

FOREIGN PATENT DOCUMENTS 78,237 11/1949 Czechoslovakia .................. 137/606

*Primary Examiner*—Robert G. Nilson
*Attorney, Agent, or Firm*—Wenderoth, Lind & Ponack

[57] ABSTRACT

A dual handle faucet for mixing hot and cold water for hand wash basins, bathing tubs, etc., has with actuator handles arranged axially at the opposite ends of a faucet case. A substantially cylindrical valve body is fixedly mounted axially in the faucet case. The valve body has two separate L-shaped passages, each having a radial inlet and an axial end outlet, the faces of the wall surrounding the end outlets constituting valve seats. The valve body also has a T-shaped passage with two coaxial end inlets and a common radial outlet. The radial inlets register with corresponding inlets in the faucet case. The radial outlet registers with an outlet or a mixing chamber merging into an outlet in the faucet case.

6 Claims, 7 Drawing Figures

DUAL HANDLE MIXING FAUCET

BACKGROUND OF THE INVENTION

1. Field of the Invention

This invention relates to dual handle mixing faucets for mixing hot and cold water, particularly a hand faucet comprising a faucet case being substantially symmetrical relatively to a transversal plane and provided with two inlets for hot and cold water, respectively, and an outlet for mixed water, which can be connected with the inlets through two valves arranged on one and the same axis in the faucet case and actuated by means of individual actuators such as handles, levers or the like.

2. Description of the Prior Art

Mixing faucets for hot and cold water are known in the prior art. Mixing faucets have been proposed previously having handles formed so that they can be actuated by one hand, if desirable. In U.S. Pat. No. 1,258,262 a mixing faucet has been described having a faucet case with inlets for cold and hot water, respectively, and a common outlet for mixed water. Valves for entering cold and hot water are arranged at portions spaced on a common axis in the faucet case. The valves have axial stems extending in mutual opposite directions and are provided outside the faucet case with turn handles. After the faucet has been used for some time the seal around the valve stem is worn down and the water leaks out from the faucet case. This disadvantage has been avoided in a mixing faucet described in U.S. Pat. No 2,075,740, where a flexible metal diaphragm completely separates the valve elements proper from the actuating structure. The axial force necessary to open the valves is transferred from the valve stems through the middle portion of the metal diaphragm. The force necessary to shut the valves is generated by a spring arranged in the valve body. The disadvantage with this embodiment is that it comprises rather many movable parts, some of which are arranged in the valve cavity which is filled with water all the time, therefore these parts are subject to corrosion.

OBJECTS OF THE INVENTION

An object of this invention is to provide a mixing faucet of the above described type wherein the above mentioned difficulties are eliminated. Another object of the invention is to provide a mixing faucet having few movable parts and which is of a simple construction. Finally, it is also an object of this invention to provide a mixing faucet having an attractive appearance.

SUMMARY OF THE INVENTION

These objects are achieved according to the present invention by providing a dual handle mixing faucet for hot and cold water comprising a substantially symmetrical faucet case provided with two inlets for hot and cold water, respectively, and an outlet for mixed water which can be connected with the inlets through two valves arranged on the same axis in the faucet case. Each valve includes a valve seat, a valve closing element, a diaphragm seal and an actuator for operating the valve closing element, such as a handle, lever or the like, turnably mounted outside the respective axial end of the faucet case for axially moving the valve closing element. The faucet includes a substantially cylindrical valve body arranged axially and fixedly mounted in the faucet case, the valve body having two separate substantially L-shaped passages, each passage having a radial inlet connected with one end of an axial outlet defined by an axially facing valve seat with a substantially smaller diameter than that of the cylindrical valve body wall. The valve body also has therein a substantially T-shaped passage having two inlets located in the end portions of the valve body at positions between the respective end outlet seats of the L-shaped passsages and the peripheral wall of the cylindrical valve body, and an outlet connected with the outlet of the faucet case.

According to an embodiment of the invention, each valve comprises a circular sealing diaphragm fixed around its periphery to engage the peripheral end portion of the valve body, to define axially with the valve in open condition a flow passage between the end outlet of the substantially L-shaped passage and the inlet of the substantially T-shaped passage.

According to another embodiment of the invention the mid portion of the diaphragm is secured in the stem of the valve closing element, which stem has a free end to engage the valve seat.

According to still another embodiment of the invention the central portion of the diaphragm is secured to the end face of the free end portion of the valve closing element stem.

According to still another embodiment of the invention the axial length of the inner portion of the valve body comprising the walls around the end outlets forming the seats is smaller than that of the peripheral wall of the valve body, to thereby define end depressions in the valve body.

According to still another embodiment of the invention the actuator handles are arranged in a cantilever fashion and so shaped and are located relatively to one another and the faucet body that the outlet portion of the faucet body restricts the movement of the handles in the direction which shuts the valves.

According to still another embodiment of the invention the nuts which actuate the valve stems are provided with small flutes on their external surfaces for engagement with corresponding flutes in the hub bores of the valve handles, making possible a close adjustment of the handles relative to the faucet body.

These and other objects of the invention will appear from the following description of an embodiment of the invention presently preferred and the accompanying drawings.

DETAILED DESCRIPTION OF THE INVENTION

Figure 1:
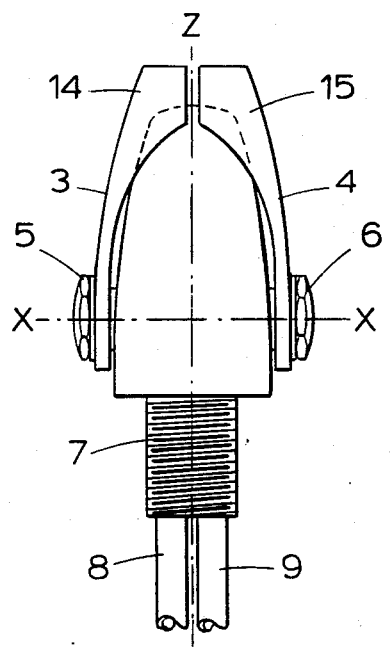
FIG. 1 is an elevation view of a faucet according to the invention.
Figure 2:
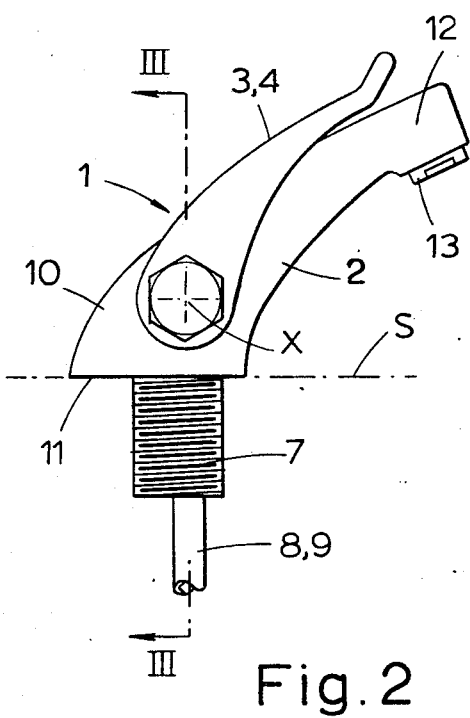
FIG. 2 is a side view of the faucet shown in FIG. 1.
Figure 3:
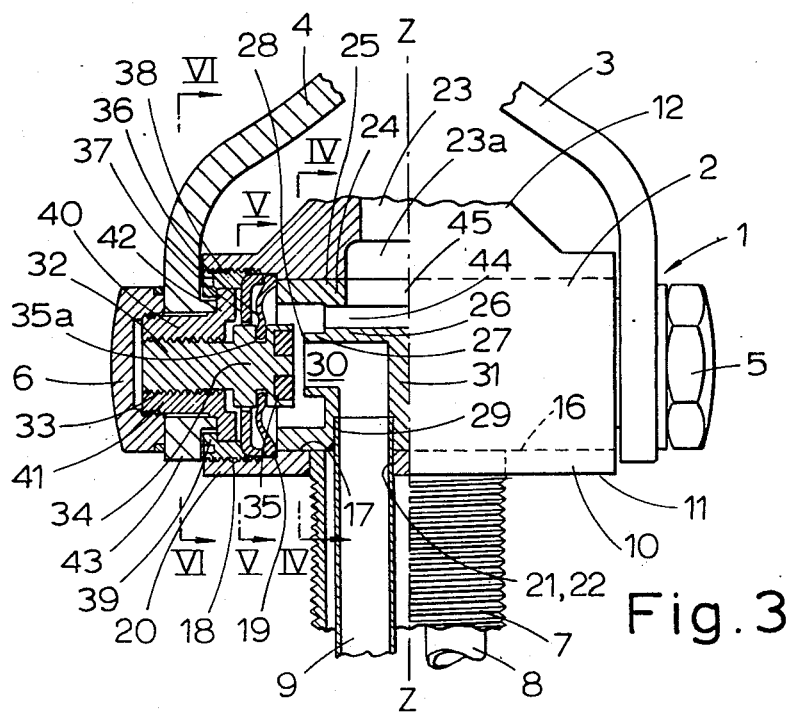
FIG. 3 is a partial section, on an enlarged scale, taken along the line III—III in FIG. 2.

In FIGS. 1–3 of the drawings a mixing faucet for cold and hot water is shown, comprising a faucet case 2 and actuating handles 3, 4 properly located by means of nut caps 5, 6 in a manner to be explained in more detail below. As shown in FIGS. 1 and 2 the faucet case is provided with a mounting pipe stub 7 enclosing the inlet pipes 8 and 9 of the faucet. The faucet case 2 has a lower portion 10 with a plane lower mounting face 11 to engage a support S, and an upper portion 12 extending in an upwardly inclined direction and having a downwardly declined outlet stub 13. The handles 3 and 4 can be swung about a common axis X.

As will appear from FIGS. 1 and 2 the faucet case 2 has the shape of an arcuate cantilever, and the handles 3 and 4 arranged on either side of the case have similar shapes. The handles 3 and 4 are also bent towards one another so that the shape of the handles to some extent corresponds to the shape of the case. In addition the end portions 14, 15 of the handles 3 and 4 are widened somewhat towards one another to allow actuating of both handles by one hand and under some circumstances by one finger only. This particular shaping of the handles 3, 4 and the arrangement of the handles relative to one another and the case provides the effect, as will appear from FIGS. 1 and 2, that the handles cannot be turned too far in clockwise direction, as viewed in FIG. 2, as the handle ends 14, 15 would then meet the upper portion 12 of the faucet case.

Cold and hot water are supplied to the faucet through the pipes 8 and 9 and are discharged from the faucet through the outlet stub 13 upon being mixed together.

Figure 4:
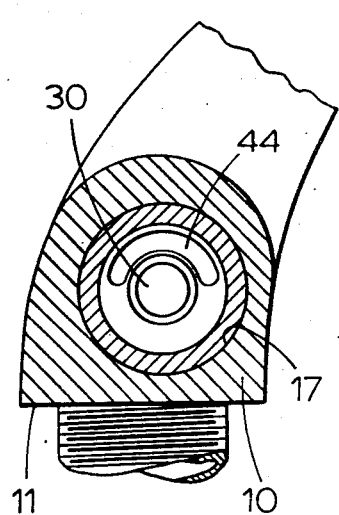
FIGS. 4, 5 and 6 are sectional views taken on the line IV—IV, V—V and VI—VI, respectively, in FIG. 3.
Figure 5:
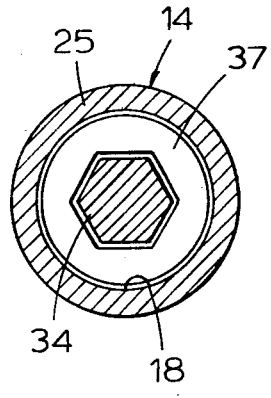
Figure 7:
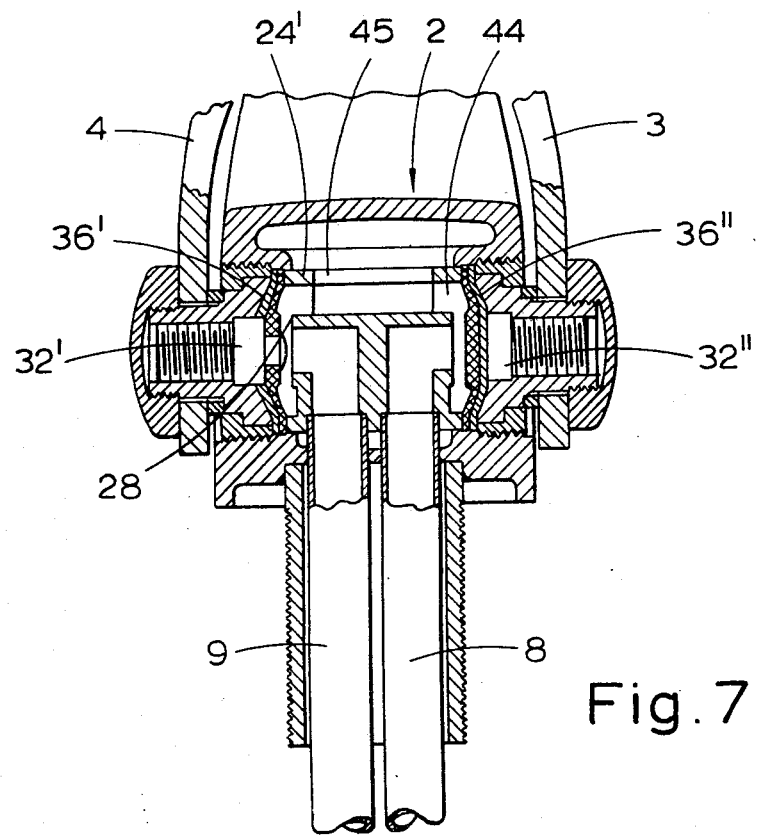
FIG. 7 is a sectional view of another embodiment of the faucet with diaphragm and shut element.

As shown in FIGS. 3 and 7, the lower portion 10 of the faucet case 2 is provided with a bore 16 extending through the case coaxially with the above mentioned axis X. The bore is only indicated in the right portion of FIG. 3, but the section of the same Figure shows that the bore 16 has a mid portion 17 (see also FIG. 4) and a larger diametered outer portion 18 (see also FIG. 5), so that a shoulder 19 is formed between the portions 17 and 18. The outer part of the bore portion 18 is provided with threads. The faucet is made symmetrical relative to a transversal plane extending perpendicularly to the axis X—X as shown by the line Z—Z in FIGS. 1 and 3. The bottom wall 20 of the faucet case 2 which is defined downwardly by the above mentioned mounting face 11 has two apertures 21, 22 located adjacent one another and having their axes substantially on the same generatrix of the mid portion 17 of the bore 16 and are provided to receive the inlet pipes 8 and 9.

In the upper portion 12 of the faucet case 2, more or less opposite to the apertures 21, 22, a passage 23 is provided leading to the valve outlet stub 13 and widened inwardly into a mixing chamber 23a.

In the bore 16 of the faucet case a valve seat body is provided in shape of a cylindrical insert body 24 having about the same length as the mid portion 17 of the bore 16. The insert body 24 has a cylindrical outer wall or face 25 and an axial central portion 26 having each of its axial ends 27 in shape of an annular short bushing or sleeve. Only the left portion of the body 24 is shown in FIG. 3. The face of the bushing-shaped end portion 27 constitutes a valve seat 28 surrounding the outlet 30 of an axial passage in the central portion 26 which in this embodiment is shorter than the outer wall 25. Two radial inlet passages 29 are connected each with its separate axial outlet 30, as the body 24 is provided with a radial separation or partition 31 separating the two inlets 29 and also the two outlets 30. Thus, these inlet passages 29, 30 are substantially L-shaped.

The body 24 is so located in the valve body bore 16 that the inlets 29 are aligned with the apertures 21, 22 in the faucet case. The inlet pipes 8 and 9 extend through the apertures 21, 22 and are received in the inlets 29 of the body 24 thereby fixing the longitudinal and circumferential position of the valve seat body in the faucet case.

In the portion of the body 24 located opposite to the inlets 29 and substantially intermediate the length of the body 24 there is provided a substantially radial outlet passage 45. The passage 45 is connected with a passage 44 extending parallel with the axis of the body 24 at a position between the ends of the body between the outer wall 25 and the central inner portion 26, so that these two passages 44, 45 together form an inverted T.

For opening and shutting each valve seat aperture 30 a valve stem 32 is arranged axially in the faucet case. The outer portion 33 of this stem is provided with threads and the inner portion 34 of the stem has a larger transversal dimension than the threaded portion 33. A position of the axial extension of inner portion 34 is polygonally shaped (in the illustrated case with a hexagonal cross section, see also FIG. 5). The inner portion 34 of the valve stem has a plane end provided with a ring-shaped groove receiving a ring seal 35 cooperating with the ring-shaped seat 28 of the valve body. The inner portion 34 has a circumferential groove 35a at a distance from its inner end. A substantially disc-shaped flexible diaphragm 36 is shaped with a central aperture defined by a ring-shaped bead which is mounted in a liquid-tight manner in the circumferential groove 35a of the valve stem. The outer bead-shaped circumferential edge of the diaphragm 36 is clenched between the end portion of the body 24, the shoulder 19 and the wall of the bore portion 18 by means of a guide disc 37 which is pressed towards the diaphragm by a clamping ring 38 provided with threads and threaded into the bore portion 18 of the faucet case. The guide disc 37 has an axial collar at the outer edge thereof and the central portion of the disc has a hexagonal aperture 38 (FIG. 5) receiving the hexagonal portion of the valve stem 32 when the valve is in its assembled position. The clamping ring 38 has at its outer end an inwardly projecting radial flange 39.

Figure 6:
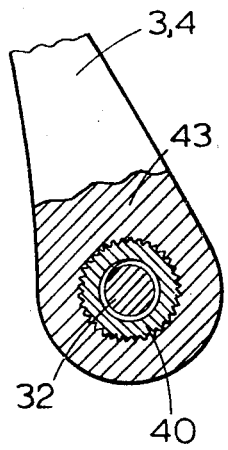

On the threaded portion 33 of the valve stem 32 a valve stem nut 40 is provided having an axial hub 41 and an outwardly facing radial collar 42. In the assembled position the collar 42 is located between the guide disc 37 and the radial flange 39 of the clamping ring 38, so that the valve stem nut 40 is substantially prevented from moving in the axial direction. The nut hub 41 is inwardly threaded and the threads thereof engage the outer threads of the valve stem 32. The outer surface of the hub 41 is provided with flutes (see also FIG. 6) engaging corresponding flutes in the bore of the hub portion 43 of the handle 4 which is mounted on the valve stem nut 40. The end portion of the nut hub 41 has a somewhat reduced diameter and is provided with threads for mounting the above mentioned nut cap 6. As mentioned above the faucet is made symmetrical. This applies also to the stems and nuts. One of the valve stems is provided with left hand threads and the other with right hand threads or vice versa.

FIG. 7 illustrates two modifications (at the right and left sides, respectively) of the diaphragm and the end portion of the valve stem. As shown at the left of FIG. 7, the valve element (the seal) and the diaphragm 36' are made integral and fixed centrally at the end of the valve stem 32' by means of a rivet, screw, or the like. The embodiment at the right of FIG. 7 shows a diaphragm 36" without any central apeture and without fixed connection with the valve stem 32", the stem having a free end portion adapted to force the diaphragm into contact with the seat 28 of the valve body.

The operation of the faucet described above is as follows. When the faucet is in the shut position the seat 35 of each valve stem 32 engages the respective valve seat 28 of the valve body 24, and the valve handles 3, 4 assume the positions as shown in FIG. 2. When one or both valve handles 3, 4 are turned counter-clockwise from the position shown in FIG. 2 the steam-ring seal 35 is lifted from the valve seat 28. Cold and/or hot water flow through the inlet pipes 8 and 9, respectively, and out through the two outlets 30 in the valve body, passing the end portion of the valve stem and flow into the passage 44 serving partly as mixing space. From the passage 44 the water flows through the passage 45 into the mixing chamber 23a in the faucet case. The mixed water leaves the faucet through the outlet passage 23 and the outlet stub 13. The mixed water temperature is adjusted by turning one or both of the handles 3, 4. When the temperature is adjusted both handles can be turned simultaneously without changing their relative position (this can be done by one hand) to adjust the total water flow.

Turning of one of the handles 3, 4 brings about turning of the respective valve stem nut 40. As the stem 32 is not allowed to turn, and the nut is not allowed to move axially the nut will displace the stem axially away from the seat 28. The diaphragm 36 will be deflected somewhat but maintains the liquid-tight seal between the inner portions of the faucet which are filled with water and the outer actuating elements of the faucet.

As it appears from FIGS. 1 and 2 the faucet has quite an attractive appearnce because of the particular shaping of the case and the handles. Apart from the appearance a further effect has been obtained, namely some protection of the seal or valve element 35 against overload. The handles 3, 4 are so mounted on the case 2 that the end portions 14, 15 of the handles (see also FIG. 2) are located at a small distance from the faucet case when the faucet is shut. The seals 35 cannot be overloaded during closing of the valves, since the application of addition force in a valve closing direction causes the handles 3, 4 to abut against the faucet case. When the seal 35 is worn down somewhat the nut caps 5, 6 should be loosened and the handles readjusted so that the necesssary clearance between the case and the handles, with the faucet in shut position, is attained. In this way the lifetime of the seal (or the diaphragm, depending on the embodiment) can be extended substantially. Fine adjustment of the handles is easily possible because of the fluted shaping of the stem nut hubs and the bores of the handles.

Although the mixing faucet which has been described by way of example is particularly suited for a hand wash basin, bathing tub, kitchen sink, or the like, it is not restricted to such a particular use. For example, it is possible to provide the faucet case with a tube or conduit for connection to a shower, and it will also appear that the outlet portion of the faucet case can be shaped as to make the faucet more suitable for mounting on a vertical wall rather than on a horizontal support. The outlet passage 44, 45 may be divided by a central partition wall (not shown) so that mixing of cold and hot water will take place only in the faucet case cavity 23a or in the outlet 23.

Provision of the cylindrical valve body 24 with the central portion 26 having central outlet apertures projecting axially away from one another and having a cylindrical outer wall portion with inlet apertures arranged therein and like-wise an outlet aperture for mixed water, brings about a mixing faucet having a long lifetime and being easy to maintain and service.

I claim:

1. A dual handle faucet for mixing and supplying hot and cold water, said faucet comprising:
    a substantially symmetrical faucet casing having hot and cold water inlets and a mixed water outlet, said faucet casing having extending transversely therethrough a cylindrical bore;
    a cylindrical valve seat body fixedly positioned and supported within said bore;
    said valve seat body having adjacent each axial end thereof an annular axial sleeve-shaped end portion having an outer diameter less than the diameter of said valve seat body, the axial outer face of each said end portion forming a valve seat;
    said valve seat body having therein two separate substantially L-shaped passages, each said L-shaped passage comprising a first outlet portion extending axially of said valve seat body through a respective said end portion thereof, and a second inlet portion extending radially outwardly from said first outlet portion through said valve seat body to the exterior thereof and joined to a respective of said hot and cold water inlets;
    said valve seat body having therein a substantially T-shaped passage comprising a first axial portion extending axially through a portion of the axial length of said valve seat body at a position therein between the outer peripheral surface thereof and said axial end portions thereof, and a second radial portion extending radially outwardly from said first axial portion through said valve seat body to the exterior thereof and connected to said mixed water outlet;
    a pair of valves mounted in said faucet casing, one each adjacent a respective of said valve seats; and
    a pair of valve actuators, one each attached to a respective of said valves, each said valve actuator comprising a handle for selectively independently moving the respective said valve between a closed position contacting the respective valve seat and blocking fluid communication between the respective said L-shaped passage and said T-shaped passage, and an open position spaced from said respective valve seat and allowing fluid communication between said respective L-shaped passage and said T-shaped passage, said handles being arranged in cantilever fashion adjacent one another such that they may be simultaneously operated by hand, said handles having end portions and said faucet casing having an outlet portion configured such that said faucet casing outlet portion limits movement of said handles in a direction to achieve movement of said valves to said closed positions thereof.

2. A faucet as claimed in claim 1, wherein each said valve comprises an axially movable valve stem, and a circular sealing diaphragm having an outer peripheral edge sealed against a respective peripheral end of said valve seat body, said valve stem, when said valve is in the closed position thereof, moving said diaphragm into sealing contact with the respective said valve seat.

3. A faucet as claimed in claim 2, wherein said diaphragm has a central portion secured to a free end face of said valve stem.

4. A faucet as claimed in claim 1, wherein each said valve comprises an axially movable valve stem, a seal positioned on a free end face of said valve stem and contacting the respective said valve seat when said valve is in the closed position thereof, and an annular sealing diaphragm having an outer peripheral edge sealed against a respective peripheral end of said valve seat body and an inner peripheral edge sealingly secured to said valve stem.

5. A faucet as claimed in claim 1, wherein the axial dimension between said valve seats is less than that of the peripheral wall of said valve seat body.

6. A faucet as claimed in claim 1, wherein each said handle has an opening therethrough defined by axially extending flutes, and each said valve includes a member having an outer periphery formed of axially extending flutes engaged with said flutes of the respective said handle.

* * * * *